United States Patent [19]

Emodi et al.

[11] 3,886,294

[45] May 27, 1975

[54] CAROTENOID COLORING COMPOSITIONS AND PREPARATION THEREOF

[75] Inventors: Alexander S. Emodi, West Orange; Leonard Joseph Scialpi, Parsippany, both of N.J.

[73] Assignee: Hoffmann-La Roche Inc., Nutley, N.J.

[22] Filed: Mar. 12, 1973

[21] Appl. No.: 340,141

[52] U.S. Cl. ............ 426/540; 426/541; 426/602; 426/250
[51] Int. Cl. .............................................. A23l 1/26
[58] Field of Search .......... 426/177, 250, 194, 227, 426/178, 328; 8/53

[56] References Cited
UNITED STATES PATENTS

| | | | |
|---|---|---|---|
| 2,861,891 | 11/1958 | Bauernfeind et al. | 426/177 X |
| 3,039,877 | 6/1962 | Borenstein | 426/250 |
| 3,227,561 | 1/1966 | Mima et al. | 426/177 |
| 3,316,101 | 4/1967 | Borenstein et al. | 426/177 |
| 3,429,714 | 2/1969 | Nelson | 426/194 |
| 3,528,822 | 9/1970 | Borenstein | 426/177 |
| 3,558,323 | 1/1971 | Cannalonga et al. | 426/194 X |
| 3,594,183 | 7/1971 | Melnick et al. | 426/250 X |

*Primary Examiner*—S. Leon Bashore
*Assistant Examiner*—Arthur L. Corbin
*Attorney, Agent, or Firm*—Samuel L. Welt; Jon S. Saxe; R. Hain Swope

[57] ABSTRACT

Liquid and powder carotenoid coloring compositions suitable for the preparation of optically clear, stable aqueous solutions, and the preparation thereof, are disclosed. The composition consist of one or more carotenoid coloring substances, an antioxidant and an emulsifier ingredient comprising a polysorbate and a mixture of monoglycerides of low molecular weight saturated coconut fatty acids and up to two optional emulsifier components selected from the group consisting of a mixture of saturated fractions of coconut oil triglycerides and a polyoxyethylene (40) stearate wax.

10 Claims, No Drawings

CAROTENOID COLORING COMPOSITIONS AND PREPARATION THEREOF

BACKGROUND OF THE INVENTION

Carotenoids, i.e. compounds such as carotene, lycopene, bixin, zeaxanthin, crystoxanthin, lutein, canthaxanthin, $\beta$-apo-8'-carotenal, $\beta$-apo-12'-carotenal and esters of hydroxyl- or carboxyl-containing members thereof have become increasingly important as food coloring agents in recent times. This importance continues to increase due to recent Federal regulations withdrawing or limiting the authorized use of certain previously certified coloring agents, e.g. FD&C Red. No. 2, in foods. While the carotenoids, which are yellow to red pigments, are of considerable interest as coloring agents for foods, their potential use has, to the present, been sharply curtailed due to their very limited solubility characteristics. Specifically, carotenoids are insoluble in water and only poorly soluble in the vegetable oils commonly utilized in food preparations. Carotenoids are also sensitive to oxidation and must therefore be utilized in conjunction with acceptable antioxidants. The insolubility of carotenoids in water has severely hindered their usefulness as coloring agents in food products which have a predominantly aqueous base such as, for example, fruit juices, carbonated beverages and the like and powdered products which are to be reconstituted such as soup mixes or those preparations which are prepared by mixing with water such as pudding mixes and gelatin desserts. Heretofore, however, the art has been unappraised of preparations containing carotenoid coloring substances which readily form stable optically clear solutions in hot or cold water. Such preparations are furnished in accordance with the present invention.

SUMMARY OF THE INVENTION

The invention relates to carotenoid coloring compositions in liquid or powder form which disperse readily in hot or cold water to form optically clear solutions. The compositions in the liquid form comprise a carotenoid coloring ingredient and an emulsifier ingredient comprising a polysorbate selected from the group consisting of polysorbate 60 and polysorbate 80 and a mixture of monoglycerides of low molecular weight saturated coconut fatty acids. In the powder form, the coloring compositions of the invention optionally also contain in the emulsifier ingredient a mixture of saturated fractions of coconut oil triglycerides and, optionally, a polyoxyethylene (40) stearate wax.

DETAILED DESCRIPTION OF THE INVENTION

The carotenoid coloring agents utilized in the compositions of the present invention are the known or synthetically available representatives of this class of compounds which are recognized in the art as being useful as coloring agents. Representative members of this class include, for example, carotene, lycopene, bixin, zeaxanthin, $\beta$-apo-8'-carotenal, canthaxanthin, cryptoxanthin, $\beta$-apo-12'-carotenal, lutein, $\beta$-apo-8'-carotenoic acid and lower alkyl esters of hydroxyl- or carboxyl-containing members of this group such as the methyl and ethyl esters. The color of aqueous solutions containing various members of this group varies from yellow through orange to red. Therefore, it is within the scope of the invention to utilize more than one of these carotenoid coloring agents in any proportion in a single composition to obtain a particular color. As all members of this group are completely compatible with the emulsifier ingredient of the present invention. The mixing of various carotenoid coloring agents in a single composition or the various compositions themselves to obtain a particular color or hue is within the skill of the art and forms an integral part of the present invention. The preferred members of the above group of carotenoid coloring agents in accordance with the present invention are $\beta$-apo-8'-carotenal, canthaxanthin and $\beta$-carotene with $\beta$-apo-8'-carotenal being most preferred.

The carotenoid coloring compositions in accordance with the present invention, whether in the liquid or powder form, contain from about 0.1 to about 2.0 percent by weight, preferably from about 0.3 to about 1.0 percent by weight of the carotenoid coloring agent. In addition, the compositions of the invention contain from about 0.1 to about 1.0 percent by weight, preferably from about 0.25 to about 0.5 percent by weight of a conventional antioxidant ingredient such as, for example, the tocopherols, butylhydroxyanisole (BHA) and butylhydroxytoluene (BHT). Of these, butylhydroxyanisole is preferred.

The carotenoid coloring compositions of the invention which are in powder form contain, in addition to the carotenoid coloring composition, from about 60 percent by weight to about 95 percent by weight of a water-soluble carrier composition which comprises a sugar, e.g. sucrose, fructose, lactose, invert sugar and the like and a water-soluble colloid-former such as, for example, hydrolyzed gelatin, low or high bloom gelatin and mixtures of hydrolyzed cereal solids and sugar such as, for example, a preparation available under the trademark Maltrin by Grain Processing Corp., Muscatine, Iowa. In addition, the carrier composition contains from about 0.2 to about 2.0 percent by weight preferably about 1.2 percent by weight of a preservative component comprising one or more conventional substances such as, for example, benzoic acid, sodium benzoate, sodium bisulfite and the like and from about 0.2 to about 2.0 percent by weight, preferably about 1.0 percent by weight of an antioxidant such as, for example, ascorbic acid, erythorbic acid and the like. Although the sugar and colloid former are preferably present in equal quantities by weight, they may be present in a weight ratio of 3 to 1 in favor of either and then total weight may comprise up to 99.6 percent of said carrier composition. The purpose of the carrier composition in the carotenoid coloring compositions of the invention is to provide said compositions in a dry, readily water-soluble form which can be utilized as a coloring agent in commercial preparations which are reconstituted with water before use such as instant gelatin desserts, pudding mixes, drink mixes and the like. The coloring compositions of the invention in powder form are particularly adaptable to use in reconstitutable drink mixes for children which characteristically have a pH of about 2.8. The compositions of the invention are ideally suited for this use as they possess the unique property of forming optically clear, stable aqueous solutions at a pH as low as 1.0. This stability is particularly critical as no carotenoid coloring preparation presently known to the art remains stable at a pH below about pH 3.0.

The emulsifier ingredient of the carotenoid coloring compositions of the invention comprises from two to four members of the following group of substances depending upon whether a liquid or powder form is contemplated. All compositions in accordance with the present invention contain in the emulsifier ingredient a polysorbate selected from the group consisting of polysorbate 60 and polysorbate 80 and a commercial product available under the tradename Drewmulse GMC 8 from PVO International Inc., Boonton, N.J. Drewmulse GMC 8 is defined by the manufacturer as a mixture of monoglycerides of low molecular weight saturated coconut fatty acids. In addition, the liquid compositions of the invention optionally contain a commercial product available under the tradename Neobee M-5 from PVO International, Inc. which is defined by the manufacturer as a mixture of saturated fractions of coconut oil triglycerides. This latter product is a component in the emulsifier ingredient of the coloring compositions of the invention which are in powder form. The powder compositions of the invention also preferably contain a commercial product available under the tradename Myrj 52 from ICI America, Inc. Wilmington, Del. which is defined by the manufacturer as a polyoxyethylene (40) stearate wax. Polysorbate 80 in an official name in the U.S. patent for polyoxyethylene (20) sorbitan mono-oleate. Polysorbate 60 is recognized in the art as a common name for polyoxyethylene (20) sorbitan monostearate.

The liquid compositions of the invention contain as the emulsifier ingredient from about 60 percent by weight to about 95 percent by weight, preferably from about 80 percent by weight to about 90 percent by weight polysorbate 60 or, preferably, polysorbate 80, from about 5 percent by weight to about 20 percent by weight, preferably from about 10 percent by weight to about 20 percent by weight of the mixture of monoglycerides of low molecular weight saturated coconut fatty acids and from 0 to about 20 percent by weight, preferably from about 0 to about 10 percent by weight of the mixture of saturated fractions of coconut oil triglycerides.

The emulsifier ingredient of the carotenoid coloring compositions of the invention in powder form comprises from about 20 percent by weight to about 80 percent by weight, preferably from about 25 percent by weight to about 45 percent by weight polysorbate 60 or polysorbate 80, from about 5 percent by weight to about 20 percent by weight, preferably from about 10 percent by weight to about 15 percent by weight of the mixture of monoglycerides of low molecular weight saturated coconut fatty acids, from about 5 percent by weight to about 20 percent by weight, preferably from about 10 percent by weight to about 15 percent by weight of a mixture of saturated fractions of coconut oil triglycerides and from about 0 to about 60 percent by weight preferably from about 35 percent by weight to about 45 percent by weight polyoxyethylene (40) stearate wax. The presence of the polyoxyethylene (40) stearate wax is preferred in the powdered preparations of the invention as, being a solid, it facilitates the forming of the spray dried powder and works to eliminate tackiness in the final powder.

The liquid carotenoid coloring compositions of the invention are prepared by heating the combined components of the emulsifier ingredient and the preservative and dissolving the carotenoid coloring agent therein. A temperature of from about 80° to about 140°C. preferably from about 100° to about 120°C. is contemplated. The preparations are thereafter allowed to cool and packaged as clear viscous liquids which "dissolve" in either hot or cold water in any proportion to yield optically clear solutions possessing excellent color and stability.

The powdered carotenoid coloring compositions of the invention are prepared by initially forming a supersaturated carotenoid liquid in the manner described above and adding the liquid while still at the formation temperature, i.e. preferably at a temperature of from about 100° to 120°C., to a previously formed aqueous solution containing the carrier composition, i.e. the soluble colloid-forming component, sugar and preservatives. The combined solutions are thereafter spray dried utilizing conventional spray drying equipment. The resultant spray dried powder is composed of submicroscopic droplets of a solution of a carotenoid coloring material in emulsifier ingredient encased in a water soluble colloidal film. These products are unique in the art.

Due to the fact that the carotenoid compositions of the present invention are in the form of a solution of a carotenoid coloring agent in an emulsifier system, they disperse in either hot or cold water to form stable solutions which are optically clear. The optical clearity of aqueous solutions of the preparations of the invention is the result of the very fine size of the carotenoid containing particles of emulsifier ingredient. The fineness of these particles and the stability of aqueous solutions containing them is demonstrated by the fact that aqueous solutions of the compositions of the invention formed from the various liquids and powders can be passed through a filter which will retain particles larger than 0.22 micron without loss of color. Solutions containing the preparations of the inventions have been demonstrated to be free from any settling of color after ½ hour on an ultracentrifuge at 40,000 × g. Aqueous solutions containing the carotenoid coloring preparations of the invention have further been demonstrated to be unaffected by pH levels as low as pH 1.0 and to sterilization processes such as by treatment in an autoclave. Such stable, optically clear aqueous solutions of carotenoid coloring agents are considered to be unique in the art.

The following examples further illustrate the invention. Unless otherwise noted, all temperatures are in degrees Centigrade.

EXAMPLE 1

A powder preparation containing 0.5 percent by weight β-apo-8'-carotenal was prepared as follows. A total of 438 grams of hydrolyzed gelatin was hydrated overnight in an equal amount of distilled water at 70°. To the gelatin solution was added 438.0 grams sucrose, 2.0 grams sodium bisulfite and 2.0 grams sodium benzoate, 0.075 grams ascorbic acid and sufficient water to make 5 liters of solution and the whole was thoroughly mixed.

In a stainless steel container, 72.0 grams of polysorbate 80, 10.0 grams of a mixture monoglycerides of low molecular weight saturated coconut fatty acids*, 10.0 grams of a mixture of saturated fractions of coconut oil triglycerides** and 2.0 grams of butylhydroxyanisole were combined and heated under a nitrogen atmosphere with constant stirring to 120° to the hot mixture was added slowly with stirring 6.0 grams of β-apo-8'-carotenal crystals and stirring was maintained at constant temperature for an additional twenty minutes to insure complete solution of the crystals.

*Drewmulse GMC-8—PVO International Inc., Boonton, N.J.
**Neobee M-5 — PVO International Inc., Boonton, N.J.

The β-apo-8'-carotenal solution formed above was added without cooling to the gelatin-sucrose solution with thorough mixing and the resulting solution immediately spray dried to form a stable powder having a moisture content of less than 2 percent by weight. The spray drying operation was conducted on a conventional spray dryer having an inlet temperature of 177° (350.6°F.) and an outlet temperature of 88° (190.4°F.).

EXAMPLE 2

A powder containing 1.0 percent by weight β-apo-8'-carotenal was prepared in a similar manner to that described in Example 1 utilizing the following formulation:

| Ingredient | Amount in Grams |
| --- | --- |
| Beta-apo-8'-carotenal | 12.0 |
| Butylhydroxyanisole | 4.0 |
| Mixture of monoglycerides of low molecular weight saturated coconut fatty acids* | 20.0 |
| Mixture of saturated fractions of coconut oil triglycerides** | 20.0 |
| Polysorbate 80 | 144.0 |
| Hydrolyzed Gelatin | 380.0 |
| Sucrose | 380.0 |
| Sodium Benzoate | 2.0 |
| Sodium Bisulfite | 10.0 |
| Ascorbic Acid | 10.0 |

*Drewmulse GMC-8
**Neobee M-5

Samples of this powder formed brilliantly clear orange-colored solutions in hot or cold water. Samples of such solutions were uneffected by the sterilization and pH tests described in Example 3.

EXAMPLE 3

A solution containing 1 percent by weight β-apo-8'-carotenal was prepared as follows. A total of 5.0 grams of butylhydroxyanisole, 120.0 grams of a mixture of low molecular weight saturated coconut fatty acids (Drewmulse GMC 8) and 863.0 grams of polysorbate 80 were heated to 120° in a stainless steel container under nitrogen. To the heated solution was added slowly with stirring 120.0 grams of β-apo-8'-carotenal. After the addition of the β-apo-8'-carotenal was completed, stirring was continued for 20 minutes at constant temperature to insure complete solution. The resulting deep red colored liquid was allowed to cool and packaged under nitrogen in tin-lined steel containers. The solution was found to readily disperse in hot or cold water to form orange-red solutions which were stable to sterilization and very acidic pH. American process cheese colored therewith to a concentration of 5 mg. β-apo-8'-carotenal per pound showed no fading over a 6-month period and 100 percent retention of the carotenal.

Samples of this solution dispersed readily in both hot and cold water to form brilliantly clear orange colored solutions. Samples of these solutions remained completely clear when subjected to sterilization on conventional autoclave apparatus and when the pH thereof was lowered to pH 2.0 with ascorbic acid.

EXAMPLE 4

A 1 percent β-apo-8'-carotenal coloring composition in powder form was prepared in accordance with the procedure described in Example 1 from the following formulation:

| Ingredient | Amount in Grams |
| --- | --- |
| β-Apo-8'-carotenal | 12.0 |
| Butylhydroxyanisole | 6.0 |
| Mixture of monoglycerides of low molecular weight saturated coconut fatty acids* | 20.0 |
| Mixture of saturated fractions of coconut oil triglycerides** | 20.0 |
| Polysorbate 60 | 56.0 |
| Polyoxyethylene (40) stearate wax*** | 86.0 |
| Hydrolyzed Gelatin | 380.0 |
| Sucrose | 380.0 |
| Sodium Benzoate | 2.0 |
| Sodium Bisulfite | 10.0 |
| Ascorbic Acid | 10.0 |

*Drewmulse GMC-8
**Neobee M-5
***Myrj 52-ICI America, Inc., Wilmington, Del.

This powder was found to readily disperse in both hot and cold water to form optically clear orange-red colored solutions comparable in properties and stability to those described in the preceding Examples.

EXAMPLE 5

A coloring preparation in powder form containing 0.3 percent canthaxanthin was prepared in accordance with the procedure described in Example 1 from the following formulation.

| Ingredient | Quantity in Grams |
| --- | --- |
| Canthaxanthin | 3.3 |
| Butylhydroxyanisole | 2.0 |
| Mixture of monoglycerides of low molecular weight saturated coconut fatty acids* | 10.0 |
| Mixture of saturated fractions of coconut oil triglycerides** | 10.0 |
| Polysorbate 80 | 74.7 |
| Hydrolyzed Gelatin | 430.0 |
| Sucrose | 430.0 |
| Sodium Benzoate | 2.0 |
| Sodium Bisulfite | 10.0 |
| Ascorbic Acid | 10.0 |

*Drewmulse GMC-8
**Neobee M-5

This powder was found to readily disperse in both hot and cold water to form optically clear orange-red colored solutions comparable in properties and stability to those described in the preceding Examples.

EXAMPLE 6

A coloring preparation in powder form containing 0.5 percent β-carotene was prepared according to the method described in Example 1 from the following formulation.

| Ingredient | Quantity in Grams |
|---|---|
| β-Carotene | 6.0 |
| Butylhydroxyanisole | 2.0 |
| Mixture of monoglycerides of low molecular weight saturated coconut fatty acids* | 10.0 |
| Mixture of saturated fractions of coconut oil triglycerides** | 10.0 |
| Polysorbate 80 | 72.0 |
| Hydrolyzed Gelatin | 430.0 |
| Sucrose | 430.0 |
| Sodium Benzoate | 2.0 |
| Sodium Bisulfite | 10.0 |
| Ascorbic Acid | 10.0 |

*Drewmulse GMC-8
**Neobee M-5

EXAMPLE 7

A coloring preparation in powder form containing 0.3 percent canthaxanthin in combination with 0.3 percent β-apo-8'-carotenal was prepared according to the method described in Example 1 from the following formulation.

| Ingredient | Quantity in Grams |
|---|---|
| Canthaxanthin | 3.0 |
| β-Apo-8'-carotenal | 3.0 |
| Butylhydroxyanisole | 2.0 |
| Mixture of monoglycerides of low molecular weight saturated coconut fatty acids* | 10.0 |
| Mixture of saturated fractions of coconut oil triglycerides** | 10.0 |
| Polysorbate 80 | 72.0 |
| Hydrolyzed Gelatin | 430.0 |
| Sucrose | 430.0 |
| Sodium Benzoate | 2.0 |
| Sodium Bisulfite | 10.0 |
| Ascorbic Acid | 10.0 |

*Drewmulse GMC-8
**Neobee M-5

EXAMPLE 8

Stability testing of the products of the preceding Examples in closed containers gave the following results based on retention of carotene coloring ingredient.

| Product of Example No. | Months | % Carotenoid Retained Room Temperature | 45° |
|---|---|---|---|
| 1 | 1 | 100 | 85 |
|   | 2 | 98 | 79 |
|   | 3 | 98 | 70 |
| 2 | 1 | 99 | 99 |
|   | 3 | 95 | 97 |
| 3 | 6 | 98 | 98 |
| 4 | 1 | 98.5 | 96 |
| 5 | 1 | 98 | 95 |
| 6 | 1 | 98 | 95 |
| 7 | 3 | 97 | 92 |

We claim:

1. A carotenoid coloring composition in liquid form dispersible in water to form optically clear aqueous dispersions, said composition consisting of from about 0.1 percent by weight to about 2.0 percent by weight of a carotenoid coloring agent, from about 0.1 percent by weight to about 1.0 percent by weight of an antioxidant and an emulsifier ingredient consisting of from about 60 percent by weight to about 95 percent by weight of a polysorbate selected from the group consisting of polysorbate 60 and polysorbate 80, from about 5 percent by weight to about 20 percent by weight of a mixture of monoglycerides of low molecular weight saturated coconut fatty acids and from about 0 to about 20 percent by weight of a mixture of saturated fractions of coconut oil triglycerides.

2. The composition of claim 1 wherein said carotenoid coloring agent is present in a concentration of from about 0.3 percent by weight to about 1.0 percent by weight and said emulsifier ingredient consists of from about 80 percent by weight to about 90 percent by weight polysorbate 80, from about 10 percent by weight to about 20 percent by weight of a mixture of monoglycerides of low molecular weight saturated coconut fatty acids and from about 0 to about 10 percent by weight of a mixture of saturated fractions of coconut oil triglycerides.

3. The composition of claim 1 wherein said carotenoid coloring agent is β-apo-8'-carotenal.

4. The composition of claim 1 wherein said carotenoid coloring agent is canthaxanthin.

5. The composition of claim 1 wherein said carotenoid coloring agent is β-carotene.

6. A carotenoid coloring composition in powder form dispersible in water to form optically clear aqueous dispersions, said composition consisting of:
 A. from about 5% by weight to about 40 percent by weight of a carotenoid ingredient consisting of
  1. a sufficient amount of a carotenoid coloring agent to constitute from about 0.1 percent by weight to about 2.0 percent by weight of the total composition;
  2. from about 0.1 percent by weight to about 1.0 percent by weight of an antioxidant; and
  3. an emulsifier ingredient consisting of:
   a. from about 20 percent by weight to about 80 percent by weight of a polysorbate selected from the group consisting of polysorbate 60 and polysorbate 80;
   b. from about 5 percent by weight to about 20 percent by weight of a mixture of monoglycerides of low molecular weight coconut fatty acids;
   c. from about 5 percent by weight to about 20 percent by weight of a mixture of saturated fractions of coconut oil triglycerides; and
   d. from about 0 to about 60 percent by weight of polyoxyethylene (40) stearate wax; and
 B. a water-soluble carrier composition consisting of:
  1. from about 0.2 percent by weight to about 2.0 percent by weight of a preservative component;
  2. from about 0.2 percent by weight to about 2.0 percent by weight of an antioxidant; and
  3. a mixture consisting of a sugar and a water-soluble colloid former, either of said components being present in the mixture in a weight ratio not exceeding 3:1.

7. The composition of claim 6 wherein said carotenoid coloring agent is present in an amount sufficient to constitute from about 0.1 to about 2.0 percent of said total composition, said emulsifier ingredient consists of:

a. from about 25 percent by weight to about 80 percent by weight of a polysorbate selected from the group consisting of polysorbate 60 and polysorbate 80;
 b. from about 5 percent by weight to about 20 percent by weight of a mixture of monoglycerides of low molecular weight coconut fatty acids;
 c. from about 5 percent by weight to about 20 percent by weight of a mixture of saturated fractions of coconut oil triglycerides; and
 d. from about 0 to about 60 percent by weight of polyoxyethylene (40) stearate wax; and said sugar and said colloid former are present in said carrier composition in equal parts by weight.

8. The composition of claim 6 wherein said carotenoid coloring agent is selected from the group consisting of $\beta$-apo-8'-carotenal, $\beta$-carotene and canthaxanthin.

9. The composition of claim 6 wherein said carotenoid coloring agent is $\beta$-apo-8'-carotenal, said antioxidant in said carotenoid ingredient is butylhydroxyanisole, said polysorbate is polysorbate 80, said sugar is sucrose, said colloid former is hydrolyzed gelatin and said sucrose and said hydrolyzed gelatin are present in said carrier composition in equal parts by weight.

10. A method of forming a carotenoid coloring composition in powder form consisting of:

A. heating a composition consisting essentially of from about 0.1 percent by weight to about 1.0 percent by weight of an antioxidant and an emulsifier ingredient consisting of
  1. from about 20 percent by weight to about 80 percent by weight of a polysorbate selected from the group consisting of polysorbate 60 and polysorbate 80;
  2. from about 5 percent by weight to about 20 percent by weight of a mixture of monoglycerides of low molecular weight coconut fatty acids;
  3. from about 5 percent by weight to about 20 percent by weight of a mixture of saturated fractions of coconut oil triglycerides; and
  4. from about 0 to about 60 percent by weight of polyoxyethylene (40) stearate wax;

to a temperature of between about 100° and 120°C. and dissolving therein a sufficient amount of a carotenoid coloring agent to constitute from about 0.1 to about 2.0 percent by weight of the total composition;

B. heating an aqueous solution of a carrier composition consisting of, based on the dry weight of said composition;
  1. from about 0.2 percent by weight to about 2.0 percent by weight of a preservative component;
  2. from about 0.2 percent by weight to about 2.0 percent by weight of an antioxidant; and
  3. a mixture consisting of a sugar and a water-soluble colloid former, either of said components being present in the mixture in a weight ratio not exceeding 3:1, to a temperature of between about 100°C. and 120°C.;

C. throughly mixing the solutions of said steps (A) and (B) maintaining the temperature thereof between 100°C. and 120°C.; and D. spray drying the resulting mixture.

* * * * *